United States Patent [19]

Kato et al.

[11] Patent Number: 4,798,813

[45] Date of Patent: Jan. 17, 1989

[54] CATALYST FOR REMOVING NITROGEN OXIDE AND PROCESS FOR PRODUCING THE CATALYST

[75] Inventors: Yasuyoshi Kato; Kunihiko Konishi; Toshiaki Matsuda; Meiji Ito; Taiji Kamiguchi; Nobue Teshima; Hiroshi Akama, all of Kure, Japan

[73] Assignee: Babcock-Hitachi Kabushiki Kaisha, Tokyo, Japan

[21] Appl. No.: 69,305

[22] Filed: Jul. 2, 1987

[30] Foreign Application Priority Data

Jul. 4, 1986 [JP] Japan .................................. 61-157448
Oct. 9, 1986 [JP] Japan .................................. 61-240894
Nov. 14, 1986 [JP] Japan .................................. 61-271533

[51] Int. Cl.$^4$ ......................... B01J 21/06; B01J 23/72; B01J 29/04; B01J 29/18
[52] U.S. Cl. ...................................... 502/60; 502/77; 502/78; 423/239
[58] Field of Search ....................... 502/60, 64, 77, 78; 423/239, 239 A

[56] References Cited

U.S. PATENT DOCUMENTS 4,046,888  9/1977  Maeshima et al. ............. 423/239 A
4,663,300  5/1987  Lester et al. ....................... 502/78 X Primary Examiner—W. J. Shine
Attorney, Agent, or Firm—Fay, Sharpe, Beall, Fagan, Minnich & McKee

[57] ABSTRACT

A catalyst for removing nitrogen oxides whose activity deterioration due to volatile poisons contained in exhaust gases is prevented and which has a superior endurance, and a process for producing the catalyst are provided, which catalyst comprises a titania having a surface area of 20 m$^2$/g or less and a zeolite having 0.01 to 20% by weight of copper supported thereon; having an average pore diameter of 10 Å or less; and having a silica/alumina molar ratio of 10 or more, and which process comprises mixing powder of the zeolite with the titania or its precursor, followed by molding the mixture into a predetermined shape, followed by calcining the resulting material at 800° C. or higher.

14 Claims, 1 Drawing Sheet

4,798,813

CATALYST FOR REMOVING NITROGEN OXIDE AND PROCESS FOR PRODUCING THE CATALYST

BACKGROUND OF THE INVENTION

1. Field of the Invention

This invention relates to a catalyst for reducing nitrogen oxides in exhaust gases containing ammonia, and particularly it relates to a catalyst for catalytic reduction, wherein the activity of the catalyst is resistant to deterioration by volatile catalyst poisons such as arsenic (As), selenium (Se), tellurium (Te), etc. contained in exhaust gases.

2. Description of the Related Art

Nitrogen oxides contained in exhaust gases from various combustion furnaces are not only harmful by themselves to the human body, but are also causes of air pollution such as photochemical smog. In order to remove such nitrogen oxides or denitrate, a catalytic reduction process with ammonia (selective reduction) has now been broadly employed. As to the catalyst utilized in the reduction process, a number of catalysts have so far been invented, and among these catalysts, those which have been practically used are catalysts composed mainly of titania (titanium dioxide) to which are added vanadium (V), molybdenum (Mo), tungsten (W) or the like. They are representatively disclosed in Japanese patent application laid-open Nos. Sho 50-51966/1975 and Sho 52-122293/1977. These catalysts are superior in that activity deterioration due to sulfur oxides, etc. are small. However, they have a drawback in that resistance to volatile catalyst poisons such as As, Se, Te, etc. is so low that activity deterioration is notable.

On the other hand, in recent years, coal and crude oil from China containing a large amount of mineral substances have been used so that there is a tendency that the concentration of the above-mentioned metals in exhaust gases increases. In such a situation, when the above-mentioned catalysts are used for denitrating such exhaust gases, a new problem has developed concerning the lowering of the catalyst's activity.

SUMMARY OF THE INVENTION

The object of the present invention is to provide a denitration catalyst wherein activity deterioration due to volatile poisons contained in exhaust gases is prevented and which has a superior endurance.

The present inventors have made extensive research in order to achieve the above object, and as a result have found that a catalyst having copper supported on a specified zeolite has a superior resistance to volatile catalyst poisons and further when titania (titanium dioxide) is blended with the above catalyst, the resulting catalyst has superior mechanical strengths and formability and also retains a high activity for a long time.

The present invention resides mainly in a catalyst for removing nitrogen oxides which comprises a titania having a surface area of 20 m²/g or less and a zeolite having 0.01 to 20% by weight of copper supported thereon; having an average pore size of 10 Å or less; and having a silica/alumina ratio of 10 or more.

DETAILED DESCRIPTION OF PREFERRED EMBODIMENTS

Figure 1:
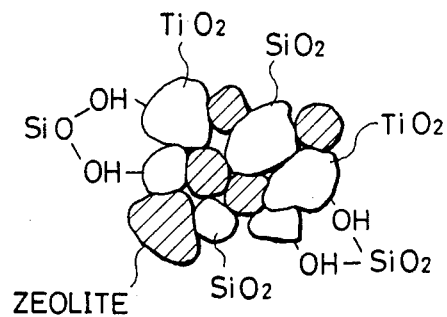
FIG. 1 shows a typical view illustrating the surface of a catalyst obtained by having methyl silicate or ethyl silicate supported by impregnation on a molded body obtained by mixing a zeolite having an active component supported thereon with titanium oxide.
Figure 2:
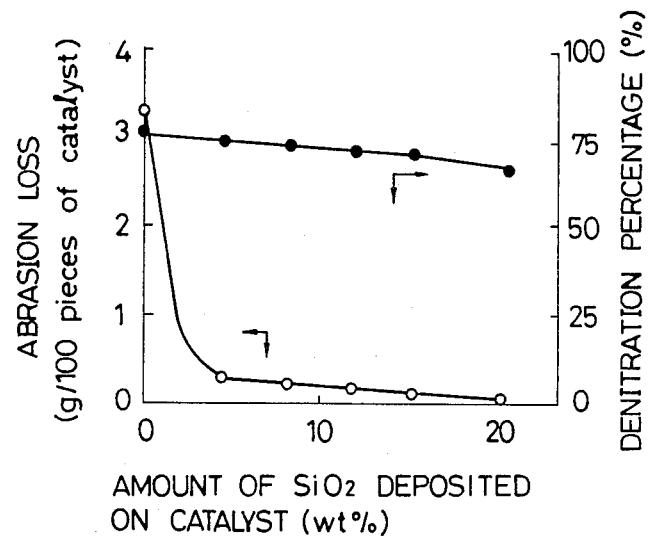
FIG. 2 shows a chart illustrating the relationship between the abrasion loss relative to the amount of $SiO_2$ and the percentage removal of nitrogen oxides in the catalyst of the present invention.

In the present invention, when aluminum sulfate, alkyl silicates, inorganic fibers or the like is contained in the above-mentioned catalyst, it is possible to further improve its mechanical properties. Particularly when alkyl silicates are impregnated into the catalytic body, it is possible to improve the mechanical properties as well as activity of the catalyst.

As to copper supported on the zeolite, most of the copper is present within the pores (micropores) of the catalyst, and the active sites are thus formed therein. Since the diameter of the pores is of such a size that the above-mentioned volatile catalyst poisons cannot enter thereinto, these active sites are not directly poisoned.

Further, when the titania is blended with the zeolite, the mechanical strengths of the catalyst are improved. However, due to the catalytic function of titania itself as well as the catalytic function caused by active sites newly formed by movement of a portion of the copper present in the pores of the zeolite onto the titania, deposition of the above volatile catalyst poisons onto the catalyst surface increases, whereby the pores of the zeolite are clogged. Hence, contrary to expectations, when titania is blended with a zeolite, the catalyst activity lowers.

Whereas, according to the present invention, by using a titania having a relatively lower surface area than those of conventional titania or by impregnating alkyl silicates into the catalyst, followed by calcination, deposition of catalyst poisons is suppressed, whereby clogging of the pores of the zeolite due to deposition of a large amount of catalyst poisons onto the catalyst is prevented.

The denitration catalyst according to the present invention is prepared by mixing a specified zeolite, having copper as an active metal supported thereon in advance, according to conventional methods such as impregnation, replacement, kneading, etc. with titania in a ratio of preferably 1:9 to 9:1, followed by subjecting and mixture to a dry molding process such as press molding, and then a rolling granulation process. Similarly, a process of adding water to the above-mentioned zeolite-titania mixture, followed by kneading the mixture to prepare a pasty material which is then subjected to extrusion molding into the form of tube, rod, honeycomb, etc, or a process of coating the above pasty material onto a metal plate, a metal gauze, a ceramic woven cloth or the like may also be used. Supporting of copper on the catalyst may also be carried out according to the above conventional process after the catalyst body has been molded. The resulting molded catalyst is calcined and then used as a practical catalyst. A catalyst obtained by impregnating an alkyl silicate such as methyl silicate or ethyl silicate into the above molded catalyst in an amount of 1 to 20% by weight, followed by calcining the resulting material, exhibits better resistance to the above volatile catalyst poisons and exhibits greater mechanical strengths since the alkyl silicate is impregnated into the macro-pores of the catalyst to bond particles to one another thereby reducing the surface area.

In the present invention, as the zeolite, those having a molar ratio of $SiO_2/Al_2O_3$ of 10 or more, preferably 20 or more and also having an average pore diameter of 10 Å or less, preferably 8 Å or less are used. Examples thereof are mordenite, ZSM-5 (tradename of a synthetic zeolite manufactured by Mobile Oil Company Ltd.), ferrierite, etc. If the molar ratio of $SiO_2/Al_2O_3$ is less than 10, the mechanical strengths and resistance to abrasion of the resulting catalyst are lowered. Further, if the average pore diameter exceeds 10 Å, a sufficient resistance to poisons is not obtained.

As to the method of supporting copper as an active ingredient, it is possible to employ various methods such as replacement, kneading, impregnation, etc. by the use of various kinds of copper salts such as copper sulfate, copper nitrate, copper acetate, etc. As to the amount of copper supported, that in the range of 0.01 to 20% by weight is suitable, and it is preferred to use an amount within the cation exchange capacity of the zeolite. Further, as to the active ingredient, in addition to copper, at least one kind of iron (Fe), vanadium (V), molybdenum (Mo) and tungsten (W) may be supported.

The mixing ratio of the zeolite to titania is preferred to be in the range of 1/9 to 9/1 in terms of a ratio of zeolite/titania. If the ratio is too small, the resistance to the above volatile catalyst poisons is insufficient, while if it is too large, the effect of improving the mechanical strengths is not notable. Thus the ratio of zeolite/titania is more preferred to be in the range of 3/7 to 8/2.

As to the titania used in the present invention, those having a surface area of 20 $m^2/g$ or less, particularly 10 $m^2/g$ or less are preferred. Such a titania may be prepared by oxidizing titanium tetrachloride obtained according to a chlorinating process i.e. A process of reacting ilmenite or rutile ore with chlorine and cokes, or it may also be prepared by calcining the precursor of titania such as titanic acid obtained by hydrolyzing titanium salts at a temperature of 800° C. or higher, preferably 900° C. or higher. Such a titanic acid may also be molded into a catalyst body, followed by calcination. Examples of such titanium salts are titanium tetrachloride, titanium sulfate, ammonium titanate, etc. In addition, even if the surface area of titania exceeds 20 $m^2/g$, when an alkyl silicate, concretely methyl titanate or ethyl titanate, is impregnated into the catalyst after molding, followed by calcination, it is possible to prepare the catalyst of the present invention.

When the alkyl silicate is impregnated into the catalyst body composed mainly of the zeolite having an active ingredient supported thereon and titania, the alkyl silicate impregnated decomposes into $SiO_2$, etc. to improve the catalyst strengths. At that time, the hydroxyl group on the titania ($TiO_2$) reacts selectively with the alkyl silicate to form a silanol bond and $SiO_2$ shown in FIG. 1 and thereby improves the catalyst strength. On the other hand, since $SiO_2$, etc. are not formed so much in the zeolite having active sites, it is possible to retain a high activity. Further, $SiO_2$, etc. partly supported on the zeolite have a function of making the zeolite pores smaller, whereby volatile catalyst poisons like arsenic, etc. in exhaust gases have difficulty in penetrating into the above pores thereby making deterioration of catalyst difficult.

It is preferred to add and mix inorganic fibers with the catalyst powder or the catalyst paste prior to molding, since the mechanical strengths of the resulting molded product of the catalyst is notably increased thereby. As the inorganic fibers, any of those having a decomposition temperature of 500° C. or higher such as glass wool, Kaowool (tradename of alumina-silica ceramic, Babcock & Wilcox Co.), asbestos, etc. may be used. The mixing proportion thereof is preferred to be in the range of 1 to 30% by weight, preferably 5 to 20% by weight, based on the total weight of the catalyst.

Zeolite has a much larger inner surface area of pores than the outer surface area. Thus, copper supported on zeolite is mostly present inside the pores wherein active sites for denitration reaction are formed. Since the diameter of such pores is of such a size that the above volatile catalyst poisons cannot penetrate thereinto the active sites are not directly poisoned by the catalyst poisons. In addition, since the outer surface area of the zeolite (outer surface area neglecting micropores) is small, it is difficult to catch the catalyst poisons. However, if titania coexists there, new active sites are formed besides the active sites of titania itself. As a result, a portion of copper forming active sites inside the pores of zeolite moves onto the titania. Such active sites are not only directly poisoned by the above volatile catalyst poisons, but also promote accumulation of catalyst poisons on the catalyst.

In the case of the catalyst according to the present invention, by using a titania having a low surface area of 20 $m^2/g$ or less, it is possible to minimize the amount of copper moving from the inside of the zeolite pores onto titania as well as the amount of the volatile catalyst poisons accumulated on the catalyst, to thereby notably reduce the activity deterioration of the catalyst.

Further, when aluminum sulfate or an alkyl silicate is impregnated into the molded catalyst body consisting of zeolite and titania, followed by drying and calcination, particles in the catalyst are crosslinked and joined to one another to improve the catalyst's mechanical strength and at the same time reduce the catalyst surface area because the macro-pores on the catalyst are crushed; thus the volatile catalyst poisons have greater difficulties in penetrating the catalyst thereby preventing activity deterioration.

The present invention will be described in more detail by way of Examples.

The surface area of the catalysts produced in the Examples were measured by the following procedure:

A catalyst (about 0.2 g) adjusted to a particle size of 10 to 20 meshes was placed in a sample cell and deaerated on heating at 160° C. After the deaeration, the weight of the sample was measured and the cell was attached to a BET surface area-measuring apparatus (Autosorb 1, tradename of an apparatus manufactured by Yuasa Ionics Co., Ltd.). Then the catalyst sample was cooled by liquid nitrogen and the amount of $N_2$ adsorbed in the catalyst at a low pressure was measured according to a constant pressure method several times and the surface area ($m^2/g$) was calculated according to BET adsorption formula.

EXAMPLE 1

An aqueous solution (1.7 l) of copper acetate ($Cu(CH_3COO)_2$) (Cu concentration: 2.1 g/l) was added to a hydrogen type synthetic mordenite (1.2 kg) having a ratio of $SiO_2/Al_2O_3$ of 23 and an average pore diameter of 7 Å followed by agitating the mixture to produce, by substitution, copper supported on the mordenite. The resulting material was then dried at 180° C., and then calcined at 500° C. for 2 hours. Methyl cellulose (10 g) as a molding adjuvant was added to a powder of the copper-supported mordenite (500 g) obtained above and titania (500 g) prepared by oxidizing titanium tetrachloride obtained according to a chlorination process (Specific surface area: 20 m$^2$/g or less) was then added to the methyl cellulose, copper-supported mordenite mixture. The combination was then mixed, and Kaowool (150 g) as an inorganic filler, and water were added to the mixture. The mixture was then kneaded by means of a kneader for 2 hours to obtain a paste, which was then dried at 180° C., further calcining at 500° C. and subsequently ground into powder of 10 to 20 meshes to obtain a catalyst.

EXAMPLE 2

The paste obtained in Example 1 was coated under pressure by rolling the paste onto a lathe plate made of SUS 304 stainless steel in the form of metal gauze having a molten aluminum sprayed thereon, to form a plate-like material, followed by air-drying it at room temperature for 8 hours and then calcining it at 500° C. for 2 hours to obtain a plate-type catalyst.

EXAMPLE 3

The catalyst obtained in Example 2 was immersed in an aqueous solution of aluminum sulfate having a concentration of 350 g/l for 15 minutes, followed by air-drying the resulting material at room temperature for 8 hours and then calcining it at 500° C. for 2 hours to obtain a catalyst.

EXAMPLE 4

A catalyst was obtained in the same manner as in Example 3 except that the aqueous solution of aluminum sulfate (concentration: 350 g/l) was replaced by ethyl silicate.

EXAMPLE 5

Example 2 was repeated except that 700 g of powder of the copper-supported mordenite and 300 g of titania were used to obtain a plate-type catalyst.

EXAMPLES 6 AND 7

Aluminum sulfate or ethyl silicate was impregnated into the catalyst obtained in Example 5 in the same manner as in Examples 3 and 4, respectively, to obtain catalysts.

EXAMPLE 8

Example 2 was repeated except that as the mordenite, a mordenite having a ratio of SiO$_2$/Al$_2$O$_3$ of 32 was used, to obtain a catalyst.

EXAMPLE 9

Aluminum sulfate was impregnated into the catalyst obtained in Example 8 in the same manner as in Example 3, to obtain a catalyst.

EXAMPLE 10

Example 2 was repeated except that as mordenite, ZSM-5 (tradename of a synthetic zeolite manufactured by Mobil Oil Company Ltd.; SiO$_2$/Al$_2$O$_3$ ratio=47) was used, to obtain a catalyst.

EXAMPLE 11

Ethyl silicate was impregnated into the catalyst obtained in Example 10 in the same manner as in Example 4, to obtain a catalyst.

EXAMPLE 12

Example 2 was repeated except that as the titania raw material, a titania obtained by water-washing a 30% by weight aqueous slurry of metatitanic acid was used, followed by filtering it, and then drying it at 180° C. for 4 hours. The resulting material was then calcined at 900° C. for 5 hours, and ground by means of an atomizer (a surface area of the titania: 5.8 m$^2$/g, its average particle size: 2.53 μm), to obtain a catalyst.

EXAMPLE 13

Example 12 was repeated except that calcination at 900° C. was replaced by that at 830° C. (the resulting titania had a surface area of 19.6 m$^2$/g and an average particle diameter of 1.85 μm), to obtain a catalyst.

COMPARATIVE EXAMPLE 1

Example 1 was repeated except that as the titania raw material, there was used a powder obtained by neutralizing a 30% by weight aqueous slurry of metatitanic acid with ammonia water, washing the neutralized material with water, filtering the resulting material and then drying it at 180° C. for 4 hours (dried powder of ammonia water-treated titanium slurry), to obtain a catalyst.

COMPARATIVE EXAMPLE 2

Example 2 was repeated except that as the titania raw material, there was used a powder obtained by washing a 30% by weight aqueous slurry of metatitanic acid with water, filtering the washed material and then drying it at 180° C. for 4 hours (dried powder of titanium slurry), to obtain a catalyst.

COMPARATIVE EXAMPLE 3

Aluminum sulfate was impregnated into the catalyst obtained in Comparative Example 2 in the same manner as in Example 3, to obtain a catalyst.

COMPARETIVE EXAMPLE 4

Example 2 was repeated except that as the titania raw material, there was used the dried powder of ammonia water-treated titanium slurry obtained in Comparative Example 1, to obtain a catalyst.

COMPARATIVE EXAMPLE 5

Example 2 was repeated except that the copper-supported mordenite was used in an amount of 1 kg and no titania was used, to obtain a catalyst.

COMPARATIVE EXAMPLE 6

Example 2 was repeated except that the ratio of the copper-supported mordenite/titania was made 0.5/9.5, that is, 50 g of the copper-supported mordenite and 950 g of titania were used, to obtain a catalyst.

COMPARATIVE EXAMPLE 7

Example 12 was repeated except that calcination at 900° C. was replaced by that at 600° C. (the resulting titania had a surface area of 54,1 m$^2$/g, an average particle size of 1.20 μm and a sulfate group content of 2.8% by weight, to obtain a catalyst.

EXPERIMENTAL EXAMPLE 1

The denitration capabilities before and after absorption of As$_2$O$_3$ were evaluated with the catalyst shown in the Examples and the Comparative Examples. The conditions of the As$_2$O$_3$ adsorption test and the measurement conditions of the denitration capability are shown below.

(1) Conditions of adsorption test:
Gas composition

| | |
|---|---|
| NO | 200 ppm |
| NH$_3$ | 240 ppm |
| SO$_2$ | 500 ppm |
| SO$_3$ | 50 ppm |
| AS$_2$O$_3$ | 10 ppm |
| CO$_2$ | 12% |
| H$_2$O | 12% |
| O$_2$ | 3% |

Reaction temperative: 350° C.
Area velocity: 51 m/h (space velocity in the case of granular catalyst)
Adsorption time: 2 hours in the case of granular catalyst; 6 hours in the case of plate-type catalyst.

(2) Measurement conditions of adsorption capability
Gas composition:

| | |
|---|---|
| NO | 200 ppm |
| NH$_3$ | 240 ppm |
| SO$_2$ | 500 ppm |
| O$_2$ | 3% |
| CO$_2$ | 12% |
| H$_2$O | 12% |
| N$_2$ | balance |

Reaction temperature: 350° C.
Area velocity: 51 m/h

EXPERIMENTAL EXAMPLE 2

With the catalysts of Examples 2 to 11 and Comparative Examples 2 to 6, a grid (MGH-70, tradename of product manufactured by Hohwa Kogyo Company) (8 kg) was dropped from a height of 50 mm onto the respective pieces of the catalysts (plate type) of 100×100 mm slanted at an angle of 45° under conditions of constant temperature and constant humidity, to measure their abrasion loss (g).

Table 1 shows the results of the initial activity, the activity after the As$_2$O$_3$ adsorption test and the abrasion test of the respective catalysts.

TABLE 1

| | Zeolite, molar ratio of SiO$_2$/Al$_2$O$_3$ | Properties of titania | | | Catalyst form | Ratio of zeolite/titania | Percentage denitration (%) | | Abrasion loss (%) |
|---|---|---|---|---|---|---|---|---|---|
| | | Surface area (m$^2$/g) | Sulfate group content (%) | Average particle diameter (μm) | | | Initial | After As$_2$O$_3$ adsorption test | |
| Example 1 | 23 | 10.7 | 0.01 | 0.35 | granul | 1/1 | 84.7 | 72.3 | — |
| Example 2 | " | " | " | " | plate | " | 73.2 | 60.1 | 1.3 |
| Example 3 | " | " | " | " | " | " | 66.3 | 58.1 | 0.03 |
| Example 4 | " | " | " | " | " | " | 66.7 | 60.9 | 0.05 |
| Example 5 | " | " | " | " | " | 7/3 | 78.7 | 65.3 | 1.4 |
| Example 6 | " | " | " | " | " | " | 74.8 | 64.9 | 0.08 |
| Example 7 | " | " | " | " | " | " | 74.5 | 66.7 | 0.08 |
| Example 8 | 32 | " | " | " | " | 1/1 | 72.2 | 57.9 | 1.5 |
| Example 9 | " | " | " | " | " | " | 64.5 | 56.6 | 0.03 |
| Example 10 | 47 | " | " | " | " | " | 70.8 | 61.0 | 1.2 |
| Example 11 | " | " | " | " | " | " | 63.3 | 58.9 | 0.06 |
| Example 12 | 23 | 5.8 | 0.03 | 2.53 | " | " | 70.1 | 66.3 | 0.07 |
| Example 13 | " | 19.6 | 0.05 | 1.85 | " | " | 75.4 | 52.0 | 1.0 |
| Compar. ex. 1 | " | 291.7 | 0.24 | 0.76 | granul | " | 78.8 | 48.0 | — |
| Compar. ex. 2 | " | 323.3 | 7.2 | 2.20 | plate | " | 71.1 | 38.3 | 2.9 |
| Compar. ex. 3 | " | " | " | " | " | " | 64.3 | 35.0 | 2.5 |
| Compar. ex. 4 | " | 291.7 | 0.24 | 0.76 | " | " | 72.0 | 45.7 | 2.2 |
| Compar. ex. 5 | " | — | — | — | " | 10/0 | 80.9 | 73.5 | 3.2 |
| Compar. ex. 6 | " | 291.7 | 0.24 | 0.76 | " | 0.5/9.5 | 50.4 | 20.6 | 0.8 |
| Compar. ex. 7 | " | 54.1 | 2.8 | 1.20 | " | 1/1 | 58.0 | 34.3 | 1.8 |

It is seen from the results of Table 1 that the respective catalysts using titania prepared according to chlorination process (Examples 1 to 11) and titania prepared by high temperature calcination (Examples 12 and 13) are not different so much from those using titania having a high surface area (Comparative Examples 1 to 7) in the aspect of the initial properties. Nevertheless the activity deterioration after As$_2$O$_3$ adsorption test of the former catalysts are far smaller than those of the latter catalysts. It is also seen that the less the surface area of titania, the greater the above-mentioned effectiveness, but the effectiveness is no longer observed so much in the case of about 50 m$^2$/g (Comparative example 7) and the effectiveness becomes notable less than about 20 m$^2$/g. Further, catalysts using titania having a smaller sulfate group content evidently have a less activity reduction after the absorption test than those of catalysts using titania having a larger sulfate group content (see Comparative Examples 4 and 2). Further, it is also evident that impregnation of aluminum sulfate, etc. is effective for preventing the activity deterioration of catalyst.

Further, in the aspect of the mechanical strengths, it is seen that the catalysts using titania having a small surface area, originally have sufficient strengths, and moreover when aluminum sulfate or the like is impregnated thereinto, the strengths are notably improved. Catalysts using titania having a large surface area are originally not so tough and also the impregnation effectiveness of aluminum sulfate or the like is small (see Comparative Examples 1 to 4), but this can be improved by impregnating alkyl silicates such as methyl silicate or ethyl silicate into the molded body of the catalysts, followed by calcination, as shown in the following Examples 14 to 20.

EXAMPLES 14 AND 15

Powder of mordenite ($SiO_2/Al_2O_3=25$; average pore diameter: 7 Å) having 3% by weight of Cu supported thereon and calcined at 500° C. for 2 hours was mixed with titanium oxide powder in a ratio by weight of 1:1, followed by adding water to the mixture to obtain a pasty material, which was then coated on a lathe plate of a stainless steel (SUS 304) having molten aluminum sprayed thereon in an oxidizing atmosphere, followed by drying the resulting material and calcining it at 500° C. for 2 hours to obtain a plate-type catalyst. This plate-type catalyst was immersed in methyl silicate or ethyl silicate liquid for one minute, followed by air-drying and thereafter calcination at 500° C. for 2 hours to obtain a catalyst.

EXAMPLES 16 AND 17

Example 14 was repeated except that a mixture of ethyl silicate with anhydrous ethanol in a ratio by weight of 2/1 or 1/2 was used, to obtain a catalyst.

EXAMPLE 18

The catalyst of Example 15 having ethyl silicate impregnated thereinto and dried was once again impregnated with ethyl silicate, followed by air-drying and thereafter calcining at 500° C. for 2 hours to obtain a catalyst.

EXAMPLE 19

The catalyst of Example 15 having ethyl silicate impregnated thereinto was allowed to stand under conditions of a temperature of 30° C. and a relative humidity of 95%, followed by drying and calcinating at 500° C. for 2 hours to obtain a catalyst.

EXAMPLE 20

A plate-type catalyst of Example 14 calcined at 500° C. for 2 hours was subjected to moisture absorption under conditions of a temperature of 30° C. and a relative humidity of 95% for 30 minutes, followed by impregnating ethyl silicate into the resulting material, air-drying and calcinating at 500° C. for 2 hours to obtain a catalyst.

The catalysts obtained in Examples 14 to 20 were tested in the same manners as in Experimental Examples 1 and 2. The results are shown in Table 2. As shown in Table 2, the catalysts of the present invention illustrated by Examples have a far reduced abrasion loss as compared with those of Comparative catalyst and at the same time retain a high activity. Thus it is seen that the present invention is a process superior in the aspect of improving the resitance to abrasion of catalyst.

TABLE 2

| Catalyst | Impregnating substance | Impregnation quantity wt % | Abrasion loss g | Percentage denitration % |
|---|---|---|---|---|
| Example 14 | Methyl silicate | 15.3 | 0.18 | 70.2 |
| Example 15 | Ethyl silicate | 12.2 | 0.20 | 71.5 |
| Example 16 | " | 8.3 | 0.25 | 73.4 |
| Example 17 | " | 4.9 | 0.36 | 74.6 |
| Example 18 | " | 20.5 | 0.14 | 65.7 |
| Example 19 | " | 12.4 | 0.16 | 71.6 |
| Example 20 | " | 7.7 | 0.18 | 72.7 |
| Compar. catalyst | — | — | 3.38 | 77.1 |

With the catalysts of Examples 14 to 18, the relationship among the amount of $SiO_2$ supported in the catalysts, the abration loss and the percentage removal of nitrogen oxides are shown in Table 2. As seen from Table 2, it is preferred that impregnation be carried out so as to give an amount of $SiO_2$ supported in the catalyst, of 3% to 20% by weight.

According to the present invention, it is possible to obtain a catalyst for denitrating exhaust gases which is resistant to in the activity deterioration caused by volatile catalyst poisons in the exhaust gases, which deterioration could not have been avoided with conventional catalysts, and also which has sufficient mechanical strengths and a superior resistance to abrasion. Accordingly, it is possible to use the catalyst of the present invention particularly as a catalyst for removing nitrogen oxides from coal combustion exhaust gases containing a large amount of dust and catalyst poisons, for a long time.

What we claim is:

1. A catalyst for removing nitrogen oxides from exhaust gases comprising titania having a surface area of 20 m²/g or less and a zeolite having between about 0.01 to about 20% by weight of copper supported thereon, wherein said zeolite has an average pore diameter of 10 Å or less and a silica/alumina molar ratio of 10 or more.

2. A catalyst according to claim 1 wherein the ratio by weight of said zeolite to said titania is in the range between about 1/9 to about 9/1.

3. A catalyst according to claim 1 further comprising between about 1 to about 30% by weight of mineral fibers based on the weight of said catalyst.

4. A process for producing a catalyst for removing nitrogen oxides from exhaust gases comprising the steps of mixing a powder of zeolite having between about 0.01 to about 20% by weight of copper supported thereon, wherein said zeolite has an average per diameter of 10 Å or less and a silica/alumina molar ratio of 10 or more, with titania having a surface area of 20 m²/g or less followed by molding the mixture and then calcining the resulting material at 800° C. or higher to obtain said catalyst.

5. A process according to claim 4 wherein said titania is titanic acid obtained by hydrolyzing a titanate.

6. A process according to claim 4 wherein said titania is produced by subjecting titanium tetrachloride to oxidation.

7. A process according to claim 4 further comprising the step of impregnating an alkyl silicate into the material before said calcination so that the amount of $SiO_2$ supported in said catalyst can be in the range between about 3 to about 20% by weight based on the weight of said catalyst.

8. A process according to claim 7 wherein said alkyl silicate is methyl silicate.

9. A process according to claim 4, further comprising the step of impregnating said catalyst body with an alkyl silicate compound after molding.

10. A process according to claim 4 further comprising the step of impregnating said catalyst body with aluminum sulfate after molding.

11. A process according to claim 9 wherein said alkyl silicate compound is methyl silicate.

12. A process according to claim 9 wherein said alkyl silicate compound is ethyl silicate.

13. A catalyst according to claim 1 wherein the ratio by weight of said zeolite to said titanium compound is in the range of between about 3/7 to about 8/2.

14. A catalyst according to claim 1 further comprising between about 5 to about 20% by weight of mineral fibers based on the weight of said catalyst.

* * * * *

UNITED STATES PATENT AND TRADEMARK OFFICE
CERTIFICATE OF CORRECTION

PATENT NO. : 4,798,813
DATED : January 17, 1989
INVENTOR(S) : Kato et al.

It is certified that error appears in the above—identified patent and that said Letters Patent is hereby corrected as shown below:

In claim 4, line 54, "800°C" should read --500°C--.

In the ABSTRACT "800°C" should read --500°C--.

Signed and Sealed this

Fifth Day of September, 1989

Attest:

DONALD J. QUIGG

Attesting Officer

Commissioner of Patents and Trademarks